Patented July 11, 1933

1,917,660

UNITED STATES PATENT OFFICE

JEROME MARTIN AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

METHOD OF SEPARATING AND RECOVERING ACETIC AND BUTYRIC ACIDS

No Drawing. Application filed July 9, 1928. Serial No. 291,477.

The present invention relates to a method of separating and recovering organic compounds from mixtures thereof, and more particularly where the compounds are in the presence of each other in an aqueous solution. More specifically, the invention relates to a method of separating and recovering butyric and acetic acids from such solutions, each acid being recovered in a high degree of purity.

In the carrying out of the so-called Langwell process for the fermentation of cellulose (see U. S. Patents 1,443,881—January 20, 1923 and 1,639,571—September 16, 1927) the product of fermentation contains, among other materials, a mixture of acetic and butyric acids in the form of their sodium salts, in aqueous solution. The recovery of these acids for commercial use has presented a problem whose solution has been attempted in various ways. This problem originates from the fact that butyric acid and water will form a mixture having a constant boiling point, and also from the fact that the affinity of acetic acid for water is of such a degree of strength that it is of considerable difficulty to effect the separation of the acetic acid from water by simple means. For that matter, acetic acid can only with the greatest difficulty be concentrated by distillation, and when acetic acid is present in the aforesaid aqueous solution of butyric acid, upon distillation of the mixture, there will result a distillate of approximately the same composition as the original solution.

Two methods, differing in principle, of obtaining pure acetic and butyric acids from the salt solution resulting from the Langwell fermentation are: 1. Evaporation to dryness (including removal of water of crystallization) and distillation with concentrated sulphuric acid; 2. Treatment of the original or partially evaporated fermentation liquors with sulphuric acid, distillation and subsequent dehydration of the crude product.

The present invention comes under the second of the above methods, and it is based upon the selective extraction by a solvent immiscible with the acid solution, of the butyric acid from the solution of the two acids. The separation of the two acids by this method can be made either in the absence or presence of a salt dissolved in the solution, but is more efficient in the latter case. The extracting medium will, after extraction, contain most of the butyric acid and but little acetic acid and water. The components of the extract can be easily separated in substantially pure form by distillation.

In the application of this process of separation and recovery to the aforesaid Langwell product, it may be mentioned that during the course of the fermentation, the acid solution derived from the action of the fermentation is neutralized with an alkaline material, such as sodium carbonate, bicarbonate, or hydroxide, or equivalents thereof, thus converting the acids present into their sodium salts, such as, for example, sodium acetate, sodium butyrate, etc. For the recovery of the acetic acid, the resulting solution is concentrated until its acetic acid content is at least 30%, expressed as acetic acid. The ratio of the acetic to butyric acid in the fermentation is found to be approximately 6 to 1. Before applying the recovery process, the volatile acids, such as the acetic and butyric acids, are liberated by the addition of sulphuric acid, from their sodium or equivalent salts formed by the addition of the neutralizing agent.

The following properties of the two acids indicate the principle involved when the extraction is carried out in the presence of a salt. Butyric acid differs from acetic acid in that it may be salted out with inorganic salts, such as $CaCl_2$, $NaCl$, $Na_2SO_4$, etc., from an aqueous solution. However, this alone does not serve for a separation because the salting out cannot be effected from a solution containing acetic acid. However, the difference between the two acids in this respect indicates that acetic acid has a greater tendency to remain in the aqueous salt solution than has butyric acid, and suggests that there may exist a favorable distribution coefficient of butyric acid between a water immiscible solvent and a saturated salt solution. As a result, it was thought that shaking a salt solution containing the two acids with a water immiscible solvent might leave most of the acetic acid in the salt water layer, and most of the butyric acid in the solvent layer. This was tested, and found to be the case. The distribution is most favorable for salt solutions dilute in acetic acid, but it has been found to be satisfactory for solutions containing from 30%–35% of the acid. The distribution coefficient of butyric acid between benzol and a saturated sodium sulphate solution which contains between 25%–30% acetic acid is approximately $$K_{HB} = \frac{C_{Benzol}}{C(H_2O + Na_2SO_4 + HA^c)} = 4 \text{ to } 6$$

For acetic acid under these conditions it is approximately $K_{HAc} = .3$ to $.5$. These figures show that the concentration of the butyric acid in the hydrocarbon layer is from 4 to 6 times that in the aqueous layer, while for the acetic acid it is less than half in the hydrocarbon layer. Hence, the benzol tends to extract much butyric acid, while extracting relatively a very small amount of acetic acid.

Both $K_{HAc}$ and $K_{HB}$ vary with the concentrations of the two acids, but the above represents a fair figure in an approximately 30% solution from the Langwell process.

The following procedure with the Langwell product gives satisfactory results:

The liquor which contains salts corresponding to a concentration of about 2% of acids is evaporated down to the point where sodium acetate and sodium butyrate or the like salts begin to crystallize out. The material is treated with sufficient sulfuric acid to release the volatile acids, and any suspended matter present is filtered off while hot. The suspended matter is found to have a tendency to cause emulsion formation with benzol, and its removal is therefore desirable. The resulting filter cake is sludged with additional water and filtered again to remove occluded acids. This operation is repeated as many times as may be found desirable, but twice is usually sufficient. The amount of water used in these sludgings should be such that the combined filtrates contain approximately 35% volatile acids. At this concentration the sodium sulfate resulting from the interaction of the acetate and butyrate with sulphuric acid is adequate to substantially saturate the solution at 20° C. and the conditions are therefore directly suitable for extraction with benzol. If necessary, sodium sulphate is added to complete saturation. The solution is then extracted five or six times with ⅕ volume portions of benzol. This will remove about 85% of the butyric acid if the original proportion of this acid to acetic is 1 to 6. The volume and number of extractions is of course determined by the amount of butyric acid present. The benzol solution obtained by a combination of these extractions contains 4–6% butyric acid and an equal amount of acetic acid. The operation may also be carried out by a multi-stage counter current process in which the aqueous acid solution is subjected to a series of extractions using in each step benzol containing less butyric acid than in the preceding one. By this method benzol containing 10–15% butyric acid may be obtained. The benzol, with traces of water and acetic acid, is distilled out and returned for reuse, leaving a mixture of anhydrous acetic and butyric acids which may be separated by fractional distillation. The benzol fraction is totally free from butyric acid. Employing this method, there is obtained the larger part of the butyric acid in fairly pure form, some anhydrous acetic acid, and a 25% solution of acetic acid in water saturated with sodium sulphate.

In accordance with this procedure, 28 kilograms of material from the Langwell fermentation were evaporated until crystallization of the salts began and the product was treated with 800 grams of 95% sulphuric acid. The resulting solution was treated as above. The combined filtrate had a volume of 1,550 cc. The solution was dark brown. Its complete saturation with sodium sulphate was indicated by the presence of large regular crystals of $Na_2SO_4.10H_2O$. Analysis of the solution showed it to contain 30% acetic acid and 5% butyric acid. One extraction with 300 cc. of benzol was made, and an analysis of the benzol showed it to contain 29 gms. of butyric acid and 15 gms. of acetic acid. (Approximately 10% butyric and 5% acetic acid.)

This was fractionated after removal of a low boiling portion, and 17 gms. of acetic acid, boiling between 110°–140°, and 25 gms. of butyric acid boiling between 140°–170° were obtained. Analysis showed the first fraction to contain about 15% butyric acid, while the latter contained 15% acetic acid. Owing to the small amounts of material involved, narrower cuts on this particular run were not attempted. In subsequent tests with larger amounts, however, the separations were much sharper, each fraction running from 95% to 98% pure and better. Instead of benzol, paraffin hydrocarbons may be employed as the extracting medium, e. g., gasoline fractions boiling from 50°–100°, or kerosene or oil fractions boiling above 190° have been successfully employed. Also all oxygen-bearing compounds so far tested, containing six to ten carbon atoms for each oxygen atom and boiling above 200°, were found to be good extracting agents, such as high boiling ketones, alcohols, esters, phenols, etc., and these high boiling solvents are preferred since with high boiling solvents it is only necessary to boil out the acetic and butyric acids leaving the solvents immediately available for reuse thereby saving distillation costs.

The presence of tarry or other organic material from the fermentation in the acid solution may cause emulsification upon the addition of the extracting material. To avoid this, the volatile acids formed by the addition of sulphuric acid to the Langwell salt solution may be free from the objectionable organic material by distillation. In this case, the distillate must be saturated with a salt such as $Na_2SO_4$, NaCl, $CaCl_2$, or the like, from an outside source, before the extraction is made.

As indicated above, the addition of salt may be omitted, the acids being then separated by the action of the immiscible solvent. The addition of the salt may be regarded as a "special case". However, in the case of the omission of the salt, a much larger volume of solvent is required; also, the salt makes the action of the immiscible solvent much more selective for the butyric acid, at the same time causing the said immiscible solvent to dissolve much less water.

A mixture of two or more immiscible solvents may be used in case it is found to give more satisfactory results than a single immiscible solvent.

The acetic acid remaining in the residual or saline solution is recovered through any of the standard methods, i. e., distillation or preferably by esterification with ethyl or methyl alcohols.

It will be understood that the above described application of the process is intended as being illustrative only, and it is desired to comprehend within the scope of this invention such modifications and changes as may be necessary to adapt it to varying conditions and uses.

What is claimed is:

1. In a method for separating aliphatic acids existing together in aqueous solution, the steps which comprise adding to said solution a water-soluble normal inorganic salt of an acid at least as strong as acetic acid, and subsequently extracting the resulting solution with a substantially water-immiscible liquid, said liquid being a solvent for at least one of the acids thus preferentially salted out.

2. In a method for separating aliphatic acids existing together in aqueous solution, the steps which comprise saturating said solution with a water-soluble normal inorganic salt of an acid at least as strong as acetic acid, and subsequently extracting the resulting solution with a substantially water-immiscible liquid, said liquid being a solvent for at least one of the acids thus preferentially salted out.

3. In a method for separating acetic and butyric acids existing together in aqueous solution, the steps which comprise adding to said solution a water-soluble normal inorganic salt of an acid at least as strong as acetic acid, and subsequently extracting the resulting solution with a substantially water-immiscible liquid, said liquid being a solvent for butyric acid.

4. In a method for separating acetic and butyric acids existing together in aqueous solution, the steps which comprise saturating said solution with a water-soluble normal inorganic salt of an acid at least as strong as acetic acid, and subsequently extracting the resulting solution with a substantially water-immiscible liquid, said liquid being a solvent for butyric acid.

5. In a method for separating aliphatic acids existing together in the form of an aqueous solution of their salts, the steps which comprise adding to said solution an inorganic acid at least as strong as acetic acid in an amount equivalent to the aliphatic acids present whereby the said aliphatic acids are set free and a water-soluble salt of the inorganic acid is formed, and subsequently extracting the resulting solution with a substantially water-immiscible liquid, said liquid being a solvent for at least one of the acids thus preferentially salted out.

6. In a method for separating aliphatic acids existing together in the form of an aqueous solution of their salts, the steps which comprise concentrating said solutions substantially to saturation with respect to said salts, adding to said concentrated solution an inorganic acid at least as strong as acetic acid in an amount equivalent to the aliphatic acids present whereby the said aliphatic acids are set free and a water-soluble salt of the inorganic acid is formed, and subsequently extracting the resulting solution with a substantially water-immiscible liquid, said liquid being a solvent for at least one of the acids thus preferentially salted out.

7. In a method for separating acetic and butyric acids existing together in the form of an aqueous solution of their salts, the steps which comprise adding to said solution an inorganic acid at least as strong as acetic acid in an amount equivalent to the amount of acetic and butyric acids present whereby the said acetic and butyric acids are set free and a water-soluble salt of the inorganic acid is formed, and subsequently extracting the resulting solution with a substantially water-immiscible liquid, said liquid being a solvent for butyric acid.

8. In a method for separating acetic and butyric acids existing together in the form of an aqueous solution of their salts, the steps which comprise concentrating said solution substantially to saturation with respect to said salts, adding to said concentrated solution an inorganic acid at least as strong as acetic acid in an amount equivalent to the amount of acetic and butyric acids present whereby the said acetic and butyric acids are set free and a water-soluble salt of the inorganic acid is formed, and subsequently extracting the resulting solution with a substantially water-immiscible liquid, said liquid being a solvent for butyric acid.

9. In a method for separating aliphatic acids existing together in the form of an aqueous solution of their alkali metal salts, the steps which comprise adding to said solution sulphuric acid in an amount equivalent to the amount of aliphatic acids present whereby the said aliphatic acids are set free and an alkali metal sulphate is formed, and subsequently extracting the resulting solution with a substantially water-immiscible liquid, said liquid being a solvent for at least one of the acids thus preferentially salted out.

10. In a method for separating acetic and butyric acid existing together in the form of an aqueous solution of their alkali metal salts, the steps which comprise adding to said solution sulphuric acid in an amount equivalent to the amount of acetic and butyric acids present whereby the said acetic and butyric acids are set free and an alkali metal sulphate is formed, and subsequently extracting the resulting solution with a substantially water-immiscible liquid, said liquid being a solvent for butyric acid.

11. In a method for separating aliphatic acids existing together in aqueous solution, the steps which comprise adding to said solution a water-soluble normal inorganic salt of an acid at least as strong as acetic acid, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for at least one of the acids thus preferentially salted out.

12. In a method for separating aliphatic acids existing together in aqueous solution, the steps which comprise saturating said solution with a water-soluble normal inorganic salt of an acid at least as strong as acetic acid, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for at least one of the acids thus preferentially salted out.

13. In a method for separating acetic and butyric acids existing together in aqueous solution, the steps which comprise adding to said solution a water-soluble normal inorganic salt of an acid at least as strong as acetic acid, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for butyric acid.

14. In a method for separating acetic and butyric acids existing together in aqueous solution, the steps which comprise saturating said solution with a water-soluble normal inorganic salt of an acid at least as strong as acetic acid, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for butyric acid.

15. In a method for separating aliphatic acids existing together in the form of an aqueous solution of their salts, the steps which comprise adding to said solution an inorganic acid at least as strong as acetic acid in an amount equivalent to the aliphatic acids present whereby the said aliphatic acids are set free and a water-soluble salt of the inorganic acid is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for at least one of the acids thus preferentially salted out.

16. In a method for separating aliphatic acids existing together in the form of an aqueous solution of their salts, the steps which comprise concentrating said solution substantially to saturation with respect to said salts, adding to said concentrated solution an inorganic acid at least as strong as acetic acid in an amount equivalent to the aliphatic acids present whereby the said aliphatic acids are set free and a water-soluble salt of the inorganic acid is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for at least one of the acids thus preferentially salted out.

17. In a method for separating acetic and butyric acids existing together in the form of an aqueous solution of their salts, the steps which comprise adding to said solution an inorganic acid at least as strong as acetic acid in an amount equivalent to the amount of acetic and butyric acids present whereby the said acetic and butyric acids are set free and a water-soluble salt of the inorganic acid is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for butyric acid.

18. In a method for separating acetic and butyric acids existing together in the form of an aqueous solution of their salts, the steps which comprise concentrating said solution substantially to saturation with respect to said salts, adding to said concentrated solution an inorganic acid at least as strong as acetic acid in an amount equivalent to the amount of acetic and butyric acids present whereby the said acetic and butyric acids are set free and a water-soluble salt of the inorganic acid is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for butyric acid.

19. In a method for separating aliphatic acids existing together in the form of an aqueous solution of their alkali metal salts, the steps which comprise adding to said solution sulphuric acid in an amount equivalent to the amount of aliphatic acids present whereby the said aliphatic acids are set free and an alkali metal sulphate is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for at least one of the acids thus preferentially salted out.

20. In a method for separating acetic and butyric acids existing together in the form of an aqueous solution of their alkali metal salts, the steps which comprise adding to said solution sulphuric acid in an amount equivalent to the amount of acetic and butyric acids present whereby the said acetic and butyric acids are set free and an alkali metal sulphate is formed, and subsequently extracting the resulting solution with a substantially water-immiscible liquid chosen from the group consisting of benzol, paraffin hydrocarbons, ketones, alcohols, esters, phenols and organic compounds boiling above 200° C. containing oxygen and at least six atoms of carbon to each atom of oxygen, said liquid being a solvent for butyric acid.

In testimony whereof we affix our signatures.

JEROME MARTIN.
IGNACE J. KRCHMA.